United States Patent [19]
Brown

[11] 3,782,366
[45] Jan. 1, 1974

[54] DENTAL PULP TESTER

[76] Inventor: Ronald W. Brown, 8340 S.W. 65th Ave., Miami, Fla. 33143

[22] Filed: Mar. 16, 1972

[21] Appl. No.: 235,391

[52] U.S. Cl. ............................. 128/2.1 R, 128/2 R
[51] Int. Cl. ............................................ A61b 10/00
[58] Field of Search ............... 128/2 R, 303.1, 399, 128/400, 303.13, 2.1 R, 173 R, 172.1, 362, 401, 403–406, 407, 410–411; 62/293; 219/229, 240–242

[56] References Cited
UNITED STATES PATENTS

| | | | |
|---|---|---|---|
| 3,274,995 | 9/1966 | Eidus | 128/2 R |
| 3,362,381 | 1/1968 | Farrell | 128/303.1 X |
| 3,507,283 | 4/1970 | Thomas, Jr. | 128/303.1 |
| 3,533,397 | 10/1970 | Scher | 128/399 X |
| 3,702,114 | 11/1972 | Zacariaii | 128/303.1 |

*Primary Examiner*—Richard A. Gaudet
*Assistant Examiner*—Lee S. Cohen
*Attorney*—Robert G. McMorrow

[57] ABSTRACT

A hand-held dental pulp tester comprising in one integral unit means for selectively applying heat, cold, electrical shock and mechanical impact to the tip of the tester which is in contact with a patient's tooth.

5 Claims, 7 Drawing Figures

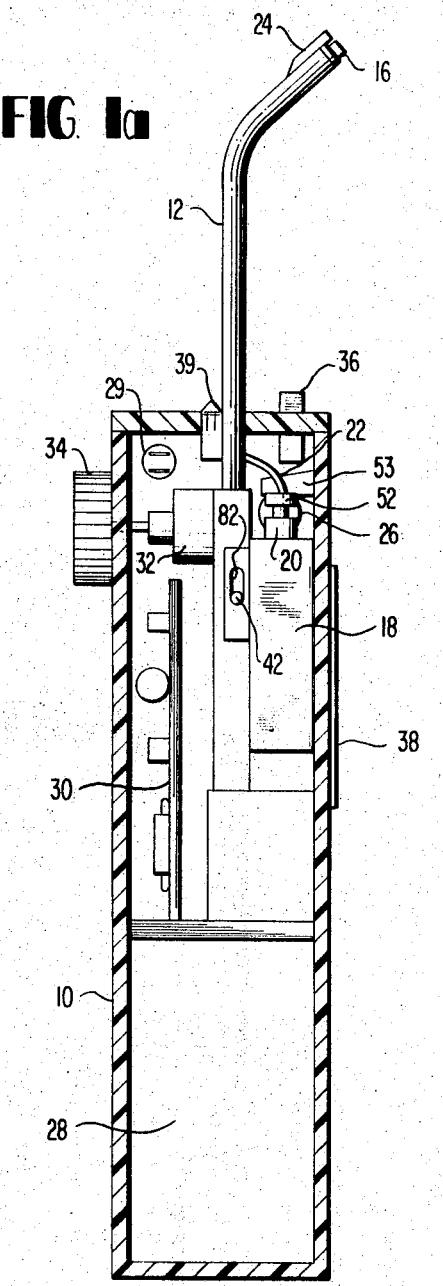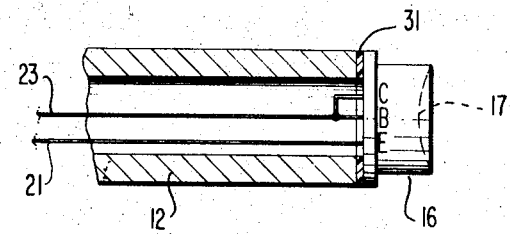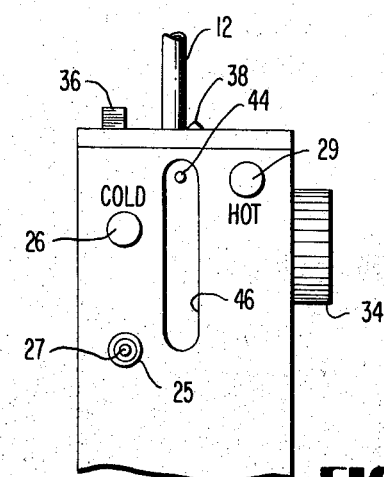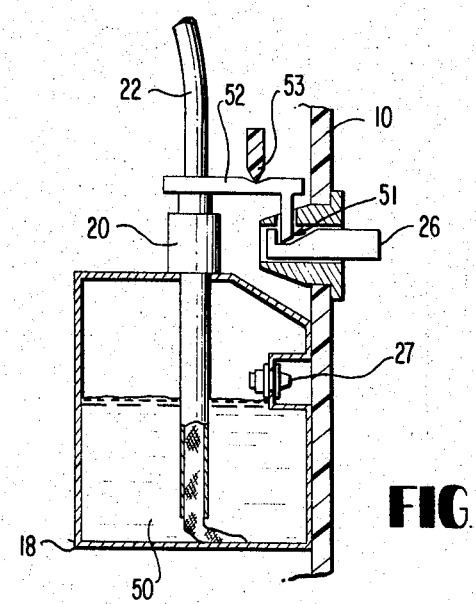

DENTAL PULP TESTER

BACKGROUND OF THE INVENTION

1. Field of the Invention

The invention relates generally to the field of human tooth testing, and, more particularly, to a hand-held device for selectively applying a plurality of physical stimuli to patient's tooth for the purpose of detecting dental pulp disease.

2. Description of the Prior Art

The state of the prior art is reflected by U.S. Pat. No. 3,274,995, issued to Eidus and U.S. Pat. No. 3,533,397, issued to Scher.

The Eidus patent discloses a dental pulp tester having a tip or probe at each end thereof. Thermoelectric devices within the tester produce heat at one tip and cold at the other tip.

Scher does not relate to a dental pulp tester but rather to a general diagnostic instrument for imparting heat, cold and electric shock to the human body for testing the responsiveness thereof to these neurological stimuli. This instrument requires two different replaceable tip modules for providing the different stimuli to the patient's body.

SUMMARY OF THE INVENTION

The primary object of this invention is to provide a completely self-contained hand-held dental pulp tester which can selectively apply four different stimuli to a patient's tooth in order to test the tooth for dental pulp disease.

A more specific object of the invention is to provide such a dental pulp tester with manually selectable independent means to provide at its permanent single tip heat, cold, electrical shock and mechanical impact stimuli to a patient's tooth.

Another object is to provide such a dental pulp tester which selectively produces all four stimuli at a single permanent tip of the tester without the need for replaceable module tips for producing the different stimuli.

BRIEF DESCRIPTION OF THE DRAWING

FIG. 1a is a partial close cross-sectional view of the preferred embodiment of the invention and also shows some components in elevation.

FIG. 1b is a cross-sectional view of the tip of the tester.

FIG. 2 is a rear elevational view of the tester illustrated in FIG. 1a.

FIG. 3 is a partial cross-sectional view showing the details of the cold producing feature of the invention.

DESCRIPTION OF THE PREFERRED EMBODIMENT

Figure 4:
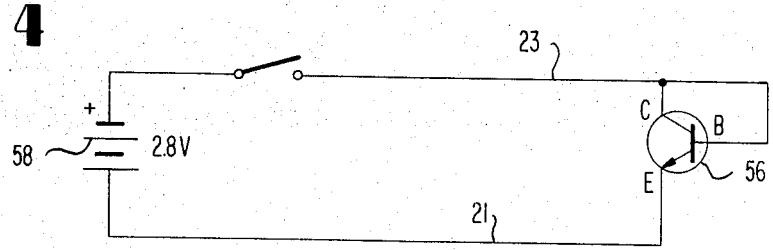
FIG. 4 is a schematic circuit diagram of the heat producing feature of the invention.

FIGS. 1a, 1b and 2 illustrate the overall structure of a preferred embodiment of the invention which includes a rigid, rectangular housing 10 made of a suitable plastic material, such as polyvinyl. Mounted within the housing for longitudinal movement relative thereto and projecting from the housing is a stainless steel tube 12 covered with insulating plastic and terminating in a metal tip 16. Tip 16 is actually the metal housing of a transistor and has a dimple 17 or depression in its top surface for providing a greater contact surface with an irregularly shaped tooth.

Mounted within housing 10 is a copper tank 18 containing liquid butane under pressure. As will be described below in more detail with respect to FIG. 3, the outlet of the butane tank is coupled through a valve assembly 20 and a discharge hose 22 to a discharge nozzle 24 mounted on the tip 16. The discharge hose passes through the interior of the hollow tube 12 and is coupled to the inlet of the nozzle 24. An actuator button 26 controls the valve assembly to control the discharge of butane from the tank 18. Housing 10 also has an opening 25 for providing access to a recessed butane refill valve 27.

The details of tip 16 are shown in FIG. 1b. The tip is fixed to the end of tube 12 by epoxy cement 31. Mounted in the tip is a heat-producing transistor which is electrically connected via wires 21 and 23 through a switch to a pair of 1.4 volt batteries mounted in the lower compartment 28 in housing 10. The switch is manually operated by an actuator button 29 which projects through housing 10. The metal tip 16 is the transistor housing which acts as a heat sink for the transistor and as the heat source of the tester. The details of the heater circuit are shown in FIG. 4.

Figure 5:
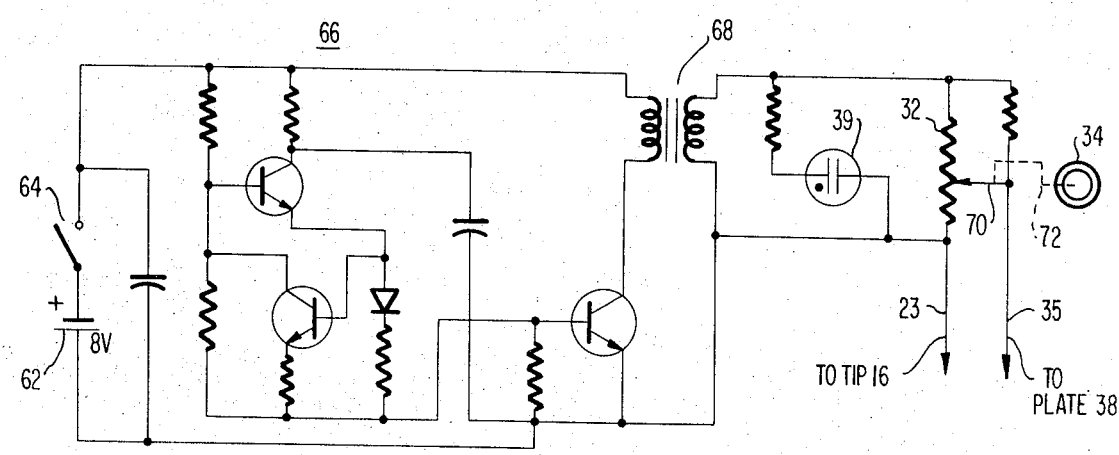
FIG. 5 is a schematic circuit diagram of the high voltage or electrical shock producing feature of the invention.

Another battery in compartment 28 is also connected to a potentiometer through a transistorized high voltage generating circuit mounted on a circuit board 30. A calibrated knob 34 may be manually rotated to operate the potentiometer and control the voltage applied to the tip 16 over a range of 0 to 400 volts. The high voltage is applied to tip 16 through wires 35 and 23 by the manual operation of a switch button actuator 36. A metal plate 38 fixed to the outside of housing 10 completes an electrical path through the patient and the dentist. A neon lamp 39 is connected in the high voltage circuit and glows when high voltage is being applied to the tip of the tester. The details of the high voltage generating circuit are shown in FIG. 5.

Figure 6:
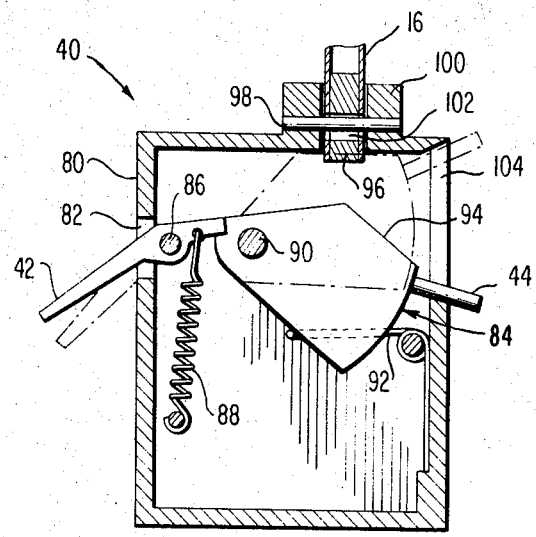
FIG. 6 is a partial cross-sectional view showing the details of the mechanical impact producing feature of the invention.

Also mounted within housing 10 in contact with the lower end of the tube 12 is a mechanical impacter assembly 40, the details of which are shown in FIG. 6. An actuating hammer trigger 42 protrudes through a slot (not shown) in housing 10. A hammer reset lever 44 protrudes through a slot 46 on the opposite side of housing 10 as shown in FIG. 2.

Turning now to the cold producing mechanism, we see in FIG. 3 the details thereof. The copper tank 18 contains a reservoir of liquid butane 50. The lower end of a wick filled with plastic foam is submerged in the liquid butane and the upper end of the wick is coupled to the valve assembly 20. The cold actuator button 26 projects through an opening in the housing 10. When the button is manually pushed inwardly, its cam surface bears upwardly against projection 51 to rotate a release lever 52 around a fulcrum 53 to open the valve assembly 20, so that some of the liquid butane is allowed to escape via the wick and is conducted via the discharge hose 22 to the tip 16 of the tester. The liquid butane is stored under pressure in tank 18. Because of the latent heat of vaporization of such a liquid, when the liquid is released from the tank and is no longer under pressure, it evaporates to cool its immediate surroundings, which in this case includes the tip 16 of the pulp tester.

FIG. 4 illustrates a schematic circuit diagram of the heater. A 2N3505 transistor 56 is connected in series with a 2.8 volt battery 58 and a switch 60 which is closed by the manual operation of the hot actuator button 29. The voltage is actually supplied by two 1.4 cells connected in series. The metal tip 16 of the tester is the transistor housing or case which supplies heat to the patient's tooth when the switch is closed.

A schematic circuit diagram of a high voltage generating circuit is illustrated in FIG. 5. This circuit is a conventional free running multivibrator which converts an 8 volt DC voltage into a 400 volt peak-to-peak AC voltage. The 8 volt battery 62 is connected through the high voltage switch 64 to the transistorized multivibrator circuit 66. The AC output from the circuit is developed across the transformer 68 which in turn is connected across the potentiometer 32. The wiper arm 70 of the potentiometer is mechanically connected via a shaft 72 to the voltage adjusting knob 34 on the housing 10. The neon lamp 39 is connected across the secondary of transformer 68 and is energized whenever the high voltage appears across the transformer. The high voltage generating circuit is energized by pushing the high voltage switch button actuator 36 which closes the switch 64, and applies the voltage to tip 16 via the wires 35 and 23.

FIG. 6 shows the details of the mechanical impacter assembly 40. The assembly comprises an impacter case 80 having a slot 82 through which the trigger 42 for a hammer 84 projects. There is a corresponding slot in the housing 10 of the tester to permit the trigger 42 also to project through the housing so that it can be manually operated by the dentist. The impacter assembly is similar to a single action pistol. The full line positions of the trigger and hammer represent the cocked position of the assembly.

Trigger 42 is pivoted on a fulcrum 86 and biased in a clockwise-direction by a spring 88. The hammer 84 is pivoted on a fulcrum 90 and is biased in a counterclockwise direction by a spring 92. In this cocked position, the inner end of the trigger engages a notch in the hammer to prevent release of the hammer. However, when the trigger handle is depressed to the dotted line position, the hammer 84 is released to rotate upward to its dotted line position so that its flat surface 94 imparts a short, quick impact to the lower end 96 of tube 16. This lower end is solid, and a retaining pin 98 passes through a boss 100 of housing 80 and through an elongated hole 102 in the tube's lower end 96, thereby permitting the tube to move sharply upwardly to provide an impact to a patient's tooth engaged by the tip 16. To recock the assembly, the reset lever 44 is rotated clockwise through slot 104 against the action of spring 92, until both the trigger and hammer are returned to their full line positions, where the hammer is again locked in the cocked position by the spring-biased trigger.

From the foregoing description, it is seen that I have invented a novel dental pulp tester which incorporates in a single hand-held instrument means for selectively providing a plurality of stimuli to a patient's tooth in order to test for dental pulp disease. These stimuli are heat, cold, electrical shock and mechanical impact. Furthermore, all of these stimuli are provided by an integral structure which does not require the replacement of components thereof to provide the different stimuli. Pieces of suitable material, such as polyvinyl chloride, are glued to various parts of the tester housing in order to retain the transformer, batteries and other components in their proper positions.

While the invention has been particularly shown and described with reference to the preferred embodiment thereof, it will be understood by those skilled in the art that various changes in form and details may be made therein without departing from the spirit and scope of the invention.

I claim:

1. A hand-held dental pulp tester comprising:
   a. a housing;
   b. a rigid tube mounted in said housing for movement along the longitudinal axis of said tube and extending therefrom and terminating in a tip;
   c. a nozzle mounted in said tip;
   d. a pressurized container of vaporizable coolant mounted in said housing;
   e. a conduit coupled between said container and said nozzle;
   f. a normally closed pressure release valve means coupled between said conduit and said container;
   g. cold actuator means mounted on said housing for opening said valve means to permit cold coolant vapor to be discharged through said conduit to said tip;
   h. electric heating means mounted in said tip;
   i. means for mounting a battery in said housing;
   j. terminal means in said housing for making electrical contact with a battery mounted in said housing;
   k. normally open switch means connected between said terminal means and said electric heating means;
   l. heat actuator means mounted on said housing for closing said switch means to energize said heating means and heat said tip;
   m. high voltage generating means connected between said terminals and said heating means;
   n. a normally open high voltage switch connected between said terminal and said high voltage generating means; and
   o. a high voltage actuator mounted on said housing for closing said high voltage switch to apply high voltage to said tip.

2. A hand-held dental pulp tester as defined in claim 1 further comprising:
   a. hammer means mounted in said housing and operable to impart sudden motion to said tube along said longitudinal axis thereof and relative to said housing; and
   b. trigger means mounted on said housing for operating said hammer means.

3. A hand-held dental pulp tester as defined in claim 1 wherein said coolant is liquid butane and further comprising a wick having one end submersed in said butane and the other end coupled to said valve means.

4. A hand-held dental pulp tester as defined in claim 2 further comprising:
   a. a potentiometer connected between said high voltage generating means and said tip; and
   b. manually operable voltage adjusting means mounted on said housing and mechanically connected to said potentiometer for adjusting the voltage applied to said tip.

5. A hand-held dental pulp tester as defined in claim 4 further comprising a high voltage indicating lamp connected to said high voltage generating means for indicating the application of voltage to said tip.

* * * * *